March 16, 1948.    H. M. McCOY    2,437,701
AIRCRAFT PROPELLER
Filed June 7, 1943    3 Sheets-Sheet 1
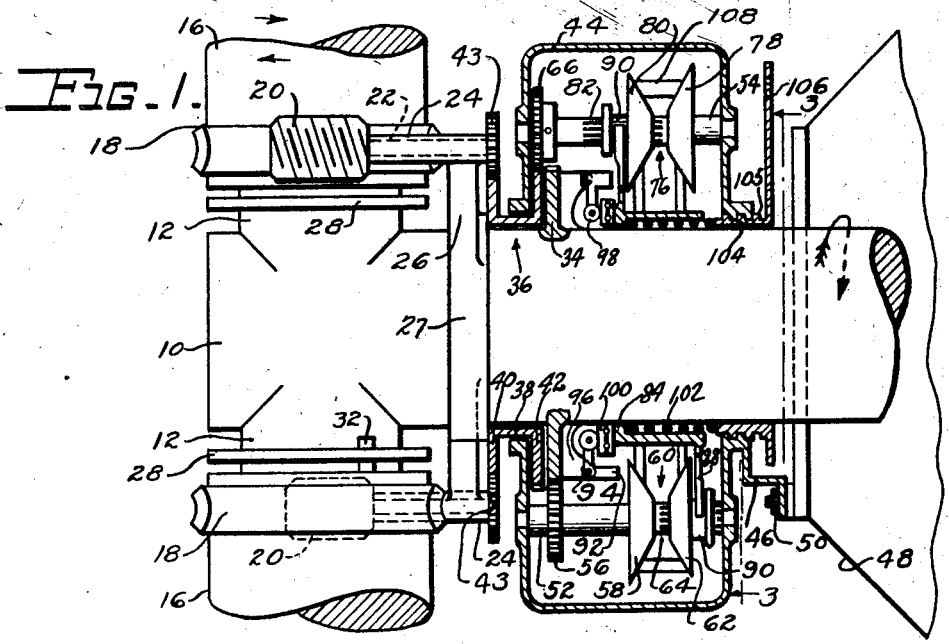
Fig. 1.
Fig. 2.
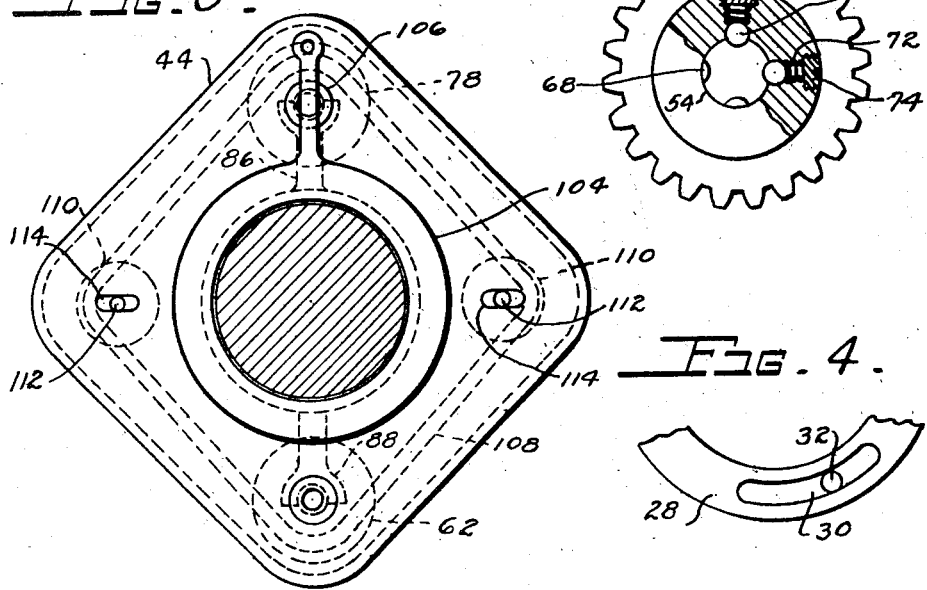
Fig. 3.    Fig. 4.
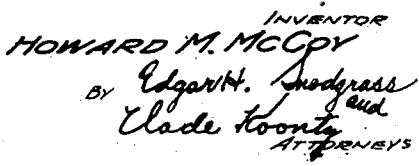
INVENTOR
HOWARD M. McCOY
BY Edgar H. Snodgrass
and
Clade Koontz
ATTORNEYS March 16, 1948.  H. M. McCOY  2,437,701
AIRCRAFT PROPELLER
Filed June 7, 1943  3 Sheets-Sheet 2
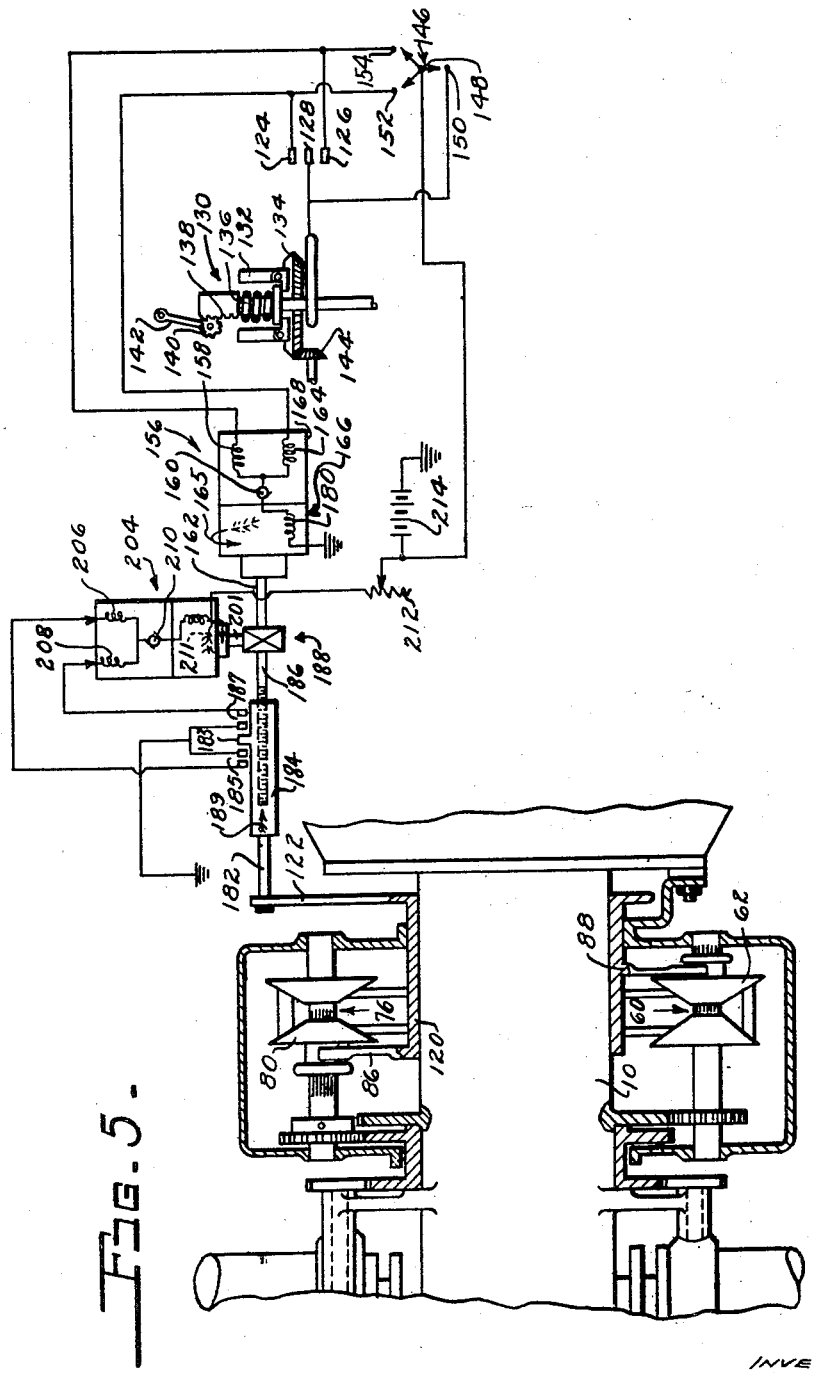
INVENTOR
HOWARD M. McCOY
BY Edgar H. Snodgrass
and Clade Koontz
ATTORNEYS March 16, 1948.  H. M. McCOY  2,437,701
AIRCRAFT PROPELLER
Filed June 7, 1943  3 Sheets-Sheet 3
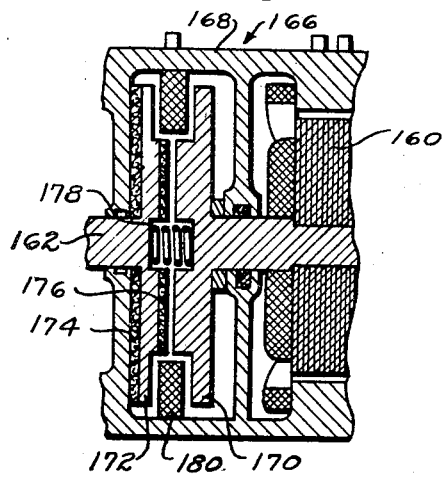
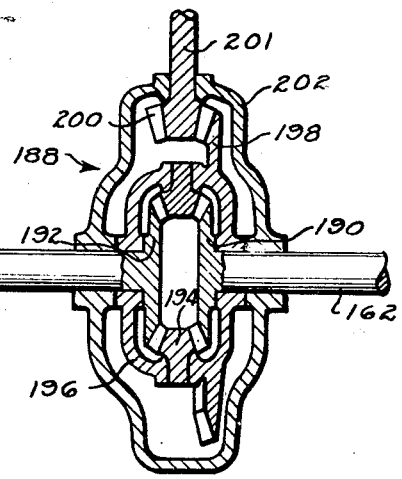
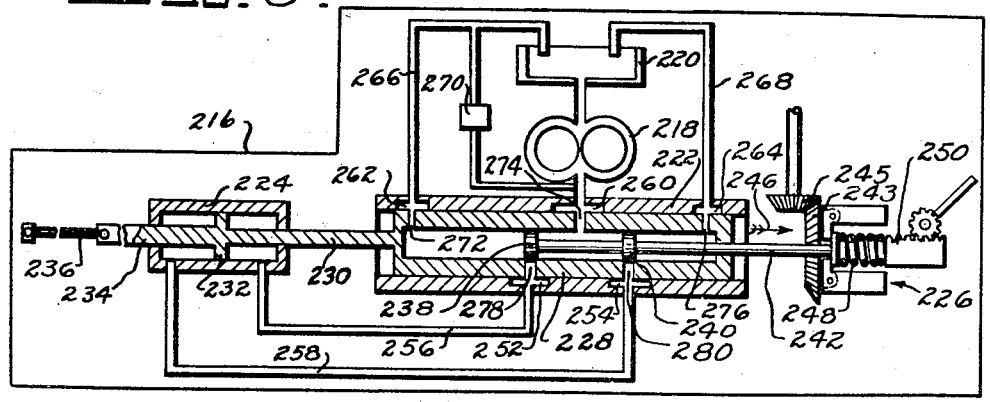
INVENTOR
HOWARD M. McCOY
BY Edgar H. Snodgrass
and Wade Koontz
ATTORNEYS Patented Mar. 16, 1948

2,437,701

UNITED STATES PATENT OFFICE 2,437,701

AIRCRAFT PROPELLER

Howard M. McCoy, Fairfield, Ohio

Application June 7, 1943, Serial No. 489,947

18 Claims. (Cl. 170—163)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to aircraft propellers, and particularly, to mechanisms by which the blade pitch may be automatically controlled, the mechanism being of that type wherein power for making changes in the blade pitch is derived from the aircraft engine itself.

The function of a variable pitch propeller is to maintain a constant engine speed for any given power application, irrespective of flight attitude or air density. Whenever, therefore, for a given power application, the revolution speed of the engine is too low for best efficiency, the blade angle is decreased to allow the engine to speed up and whenever for a given power application, the revolution speed of the engine is too high for best efficiency, the blade angle is increased to bring the speed of the engine down to the selected normal.

It is therefore an object of the invention to provide an effective but inexpensive mechanism which will sense the need for a change in blade angle, measure the amount of the change, and automatically make the necessary change without the attention of the pilot.

In normal level flight, the necessary changes in pitch angle from one moment to the next are usually very slight, so that a mechanism which will respond fast enough to change pitch at a rate of several degrees per second is usually quite satisfactory for this purpose, yet many occasions arise where a sudden change in flight attitude or air density may require so considerable a change in blade angle that it is highly desirable to change to the new angle at a much faster rate.

It is therefore another object of the invention to provide mechanism which will sense not only an off-speed condition, but will sense the magnitude of the off-speed condition, whereby a relatively low rate of pitch change will be had when the amount of the change required is small, and an appropriately higher rate of pitch change will be had when the amount of change is large, with an infinite number of intermediate ratios of pitch change which may vary by infinitesimal increments between the low rate and the high rate.

Other objects and advantageous features will become apparent as the accompanying description is considered with reference to the drawings wherein, Fig. 1 is a view shown partly in vertical axial section and partly in elevation through a propeller having pitch change mechanism which incorporates my improvements.

Fig. 2 is an enlarged detail view of a yieldable drive which is interposed between one of the gears and its shaft.

Fig. 3 is an end view showing an arrangement of the pulleys of the mechanism.

Fig. 4 is a fragmentary view showing one of the stops which are provided to limit pitch change.

Fig. 5 is a schematic view showing a pitch change mechanism similar to that shown in Fig. 1 except that the centrifugal governor in Fig. 5 acts through an electric servo mechanism to change the pitch.

Fig. 6 is an enlarged view of an electrically operated combination brake and clutch which is employed as part of the servo mechanism of Fig. 5.

Fig. 7 is an enlarged view of a differential gear mechanism which is employed as part of the servo mechanism shown in Fig. 5.

Fig. 8 is a schematic view showing a hydraulic analogy of the electric servo mechanism of Fig. 5.

Like reference characters refer to like parts throughout the drawings.

Referring to the drawings, and more particularly to Fig. 1, a propeller hub 10 at the forward end has two oppositely extending elongated bosses 12, upon which the hollow shanks 16 of the propeller blades are rotatable. Worm wheels 18 are attached to, or integral with, the blade shanks 16, each worm wheel being meshed with a worm 20, the shaft 22 of which is rotatable in an elongated bearing 24, which is supported by a bracket 26 extending outwardly from a ring 27 fast on the mid portion of the hub 10. Annular discs 28, fast on the bosses 12, are provided with arcuate slots 30. Pins 32 extend from the blade shanks near the periphery into slots 30 to limit rotation of the blades on their axes.

Carried on the hub 10 for unitary rotation therewith is a gear 34, and free to rotate between gear 34 and the ring 27 is a cluster gear 36 which comprises a sleeve 38 with gears 40 and 42 integral therewith, or otherwise secured thereto. Pinions 43, fast on the end of the shafts 22, are in mesh with the gear 40. Runningly fitted to the outside of the sleeve 38 is a housing 44 which is held against rotation by a bracket 46 which extends from the rear end of the housing, the bracket being secured to the nose of the engine 48 by bolts 50.

Two countershafts 52 and 54 are rotatably supported in the walls of the housing, which may be closed, as shown, or be in the form of an open frame. A pinion 56 fast on the shaft 52 is in mesh with the gear 34. A V belt-pulley 60 has the one half 58 fast on the shaft 52, the other half 62 being slidable axially on splines 64 carried by the shaft. The pinion 66 is yieldably secured to the shaft 54, as shown in the enlarged view, Fig. 2, the shaft having depressions 68 into which balls 70 are pressed by springs 72, the springs being held under compression by screws 74. Pinion 66 is in mesh with the gear 42 whereby it rotates the propeller blades on their axes through the gears 42 and 40, pinions 43, worms 20 and worm wheels 18. The springs 72 apply sufficient inward pressure to the balls 70 to enable the shaft 54 to drive the pinion 66 against the normal resistance which the blades offer to rotation, but allow slippage of the shaft 54 in the pinion 66 upon supernormal resistance of the blade, as, for instance, when the limit pins 32 encounter the ends of the slots 30.

A V belt-pulley 76 has the one half 78 fast on the shaft 54, the other half 80 being slidable axially on the splines 82. A sleeve 84, slidable on the propeller hub 10, at the forward end has an arm 86, and diametrically opposite at the rear end, has an arm 88.

Pulley parts 62 and 80 have grooved hubs 90, and the ends of the arms are bifurcated to extend part way around the grooves, whereby rearward movement of the sleeve 84 widens the pulley 60 and narrows the pulley 76, which decreases the belt track diameter of the pulley 60 and increases the belt track diameter of the pulley 76. Centrifugally operative members 92 are hinged at 94 to brackets 96 on the propeller hub. Members 92 are in the form of bell cranks, at the inner ends of which a roller 98 is rotatably supported. Roller 98 bears against an antifriction thrust bearing 100, which in turn, bears against the forward end of the sleeve 84. Outward swinging of the main body of the member 92, therefore, moves the sleeve 84 rearward. A spring 102 acts against the sleeve 84 to move it forward.

Spring 102, at the rear end, abuts against a collar 104, which preferably has a relatively coarse pitch multiple thread 105 which is rotatable freely in corresponding internal threads in the housing 44. An operating arm 106 extends outwardly from the collar 104. Rotation of the collar by the operating arm moves the collar back and forth on the propeller hub, whereby the stress of the spring is decreased or increased. Suitable connections to the arm 106 may be made whereby the stress of the spring 102 may be remotely controlled.

A V belt 108 encircles both pulleys 60 and 76, and, in order to keep the belt from dragging on the propeller hub 10, two idler pulleys 110 are rotatably supported in the housing 44. Idler pulleys 110 may be free to rotate on shafts 112 which may be held in slots 114 so that adjustment for belt stretch may be made. It will, of course, be understood that the exact pulley arrangement shown need not be followed, since any arrangement employing two countershafts joined by an automatically operable, infinitely variable drive and having one countershaft drivably connected to the propeller hub and the other drivably connected to the propeller blade, will be considered within the spirit of the invention. Thus, the idler pulleys may be eliminated by locating both countershafts on the same side of the propeller hub and relatively close together, whereby a shorter V belt may be used. As a further alternative, the drive between the two V belt-pulleys may be effected by using a ring of the same V-shaped cross section as the belt 108, the ring being made of metal or other rigid material, arranged to closely encircle the two V belt-pulleys for driving one by the other without the aid of any idler pulleys. Such a ring will be considered as broadly included in the term "belt."

For any given stress of the spring 102 which is variable by movement of the arm 106, there is a corresponding propeller speed at which the centrifugal members 92 will assume the midway position shown in Fig. 1. In this midway position, the rollers 98 which preferably hold the sleeve 84 so positioned that the belt tracks of the V belt-pulleys are of equal diameters, provided, of course, that the ratio of the gear 34 to the pinion 56 is the same as the ratio of the gear 42 to the pinion 66. If these gear ratios differ, compensation may be made for the difference by an inverse ratio in the pulleys.

For purposes of description, it will be assumed that the gear-to-pinion ratios mentioned are equal, and that in the midway position of the centrifugal members 92, the pulleys 60 and 76 have belt tracks of equal diameter.

With gears and pulleys proportioned as above assumed and the centrifugal weights in the mid position shown, the gear 34, which is fast on the propeller hub, will drive the cluster gear 36, which is free on the propeller hub, at propeller speed. As long as there is no difference in the speed of rotation between the propeller hub and the cluster gear 36, the blades will, obviously, not rotate about their axes. This may be referred to as the equilibrium position.

When the propeller overspeeds, the centrifugal members 92 swing out about the hinge pin 94, and the arms 86 and 99 will move rearward, that is, to the right in the drawing, which provides a belt track of smaller diameter on the pulley 60 and one of larger diameter on the pulley 76, which causes a loss of rotations of the cluster gear 36 with respect to the propeller hub 10, whereby the propeller blades rotate anti-clockwise, looking at the tip of the blade.

Conversely, when the propeller underspeeds, the centrifugal members 92 swing inward on the hinge pins 94, and the spring 102 moves the arms 86 and 88 forward, that is, to the left in the drawing, which provides a belt track of larger diameter on the pulley 60 and one of smaller diameter on the pulley 76. This causes a gain in rotations of the cluster gear 36 with respect to the propeller hub 10, whereby the propeller blades rotate clockwise, looking at the tip of the blades.

Movement of the arm 106, to change the stress of the spring 102, merely changes the speed of rotation at which the centrifugal members 92 come to their center position, the pulleys to an equal diameter, and the blades into equilibrium. If, for any reason, pitch adjustments, either increase or decrease, continue beyond predetermined limits, the pins 32 will encounter the ends of the slots 30 and stop further change in pitch, the ball and spring drive 70, 72, meanwhile, permitting the shaft 54 to ratchet in the gear 66.

It is noted that in conventional automatic variable speed drives using V belt-pulleys, it is customary to employ a centrifugal weight and spring to respectively increase and decrease the belt track of one of the pulleys, then use a separate spring to yield or take up the belt on the other adjustable V belt-pulley, while in the present invention, the arrangement is such that, when the weight operates, it acts on a mechanism which positively increases the belt track of one of the pulleys and, at the same time, positively decreases the belt track of the other pulley.

In the modification, Fig. 5, the same gear, pulley, and belt mechanism is employed as has hereinbefore been described with reference to Fig. 1. The centrifugal governor of Fig. 5, however, acts through an electric servo mechanism to change the belt track diameters of the pulleys for changing the propeller pitch.

In Fig. 5, the arms 86 and 88, which shift the pulley parts 80 and 62, respectively, are carried on a sleeve 120 which is slidable axially on the propeller hub 10. An arm 122 extends radially from the sleeve 120. The servo mechanism for effecting pitch change is attached to the outer end of the arm 122.

The electric servo mechanism in Fig. 5 comprises a fixed pitch-increase contact 124, a fixed pitch-decrease contact 126, and a movable contact 128 which is arranged to be raised into engagement with the pitch-increase contact or lowered into engagement with the pitch-decrease contact.

A centrifugal governor 130 has flyweights 132 hinged to a gear 134 and adapted to swing outward upon overspeed to raise the movable contact 128 into engagement with the fixed contact 124, and a spring 136 adapted upon underspeed to force the weights inward and lower the movable contact 128 into engagement with the fixed contact 126. A rack 138 and pinion 140 is operable by a lever 142 to vary the stress of the spring 136, thereby to vary the rotative speed at which the governor will assume the "on speed" condition shown in Fig. 5. The gear 134 is driven by a pinion 144, the speed of which is a function of the propeller hub speed. A manually operable switch 146 is operable to connect the common post 148 to the post 150 for governor operation; to the post 152 for manual pitch increase; and to the post 154 for manual pitch decrease.

A servomotor 156 has one field coil 164, which, when connected in series with the armature 160 through automatic engagement of the contacts 124 and 128 or manual engagement of the contacts 148 and 152, rotates the shaft 162 in the direction of the arrow 165 to effect pitch increase, and another field coil 158, which, when connected in series with the armature 160 through automatic engagement of the contacts 126 and 128 or manual engagement of the contacts 148 and 154, rotates the shaft 162 in the direction opposite the arrow 165 to effect pitch decrease.

The servomotor 156 is provided with a clutch and brake mechanism 166 which is shown built into the motor, but may be built separately, if desired. The mechanism 166 is shown to an enlarged scale in Fig. 6, as being built onto the end of the motor housing 168, and comprises a clutch disc 170 fast on the armature 160 and a clutch and brake disc 172 fast on a shaft 162, disc 172 being faced with a brake lining 174 on one side and a clutch lining 176 on the other, whereby the motor will cease rotation within relatively few revolutions after the current is shut off.

A spring 178 in counterbored openings between discs 170 and 172 holds the clutch facing 176 out of engagement with the clutch disc 170 and, at the same time, holds the brake lining 174 in contact with the front wall of the housing. An electrically energizable coil 180, located between the discs 170 and 172 is adapted upon energization to draw the disc 172 and its lining 174 away from the end of the housing and at the same time draw the discs together to effect clutching contact between the facing 176 and the clutch disc 170. With this arrangement, the clutch is always engaged when the motor is energized for rotation, and the brake is always applied whenever current is shut off from the motor.

A rod 182, extending from the arm 122 is enlarged at 184, the enlarged part being internally tapered to freely receive the threaded end of the shaft 186. A lug 183 on the part 184 is positioned to close a switch 185 when the part 184 moves to the left as it does when the pitch is too high and should therefore be decreased, or to close a switch 187 when the part 184 moves to the right as it does when the pitch is too low and should therefore be increased. A differential gear 188 is shown to an enlarged scale in Fig. 7, and comprises gears 190 and 192, fast on shafts 162 and 186, respectively, pinions 194 in mesh with gears 190 and 192, a pinion carrier 196 to rotatably support the pinions, a bevel drive gear 198 on the carrier, and a drive pinion 200 fast on a shaft 201 which is rotatably supported in the housing 202, the pinion being in mesh with the drive gear 198.

A follow-up motor 204 has two oppositely wound field coils 206 and 208, the coil 206 being connected in series with the armature 210 when the lug 183 has moved to the left until it has closed the switch 185, and the coil 208 being connected in series with the armature 210 when the lug 183 has moved to the right until it has closed the switch 187. The direction of rotation of the follow-up motor 204 is always such that when the servomotor 166 moves the part 184 to the left for pitch decrease, the follow-up motor 204, through the differential 188, moves the lug 183 to the right until it reaches the midway position shown in the drawing, and when the servomotor moves the part 184 to the right for pitch increase, the follow-up motor, through the differential, moves the lug 183 to the left until it reaches the same midway position shown in the drawing. To effectuate this result, the coil 208 should be so wound that, when it is operative, the follow-up motor will rotate in the direction of the arrow 211, the coil 206 being wound for rotation in the opposite direction.

A second clutch and brake mechanism 166 hereinbefore described with reference to Fig. 6, is built onto the follow-up motor 204, the pinion shaft 201, however, instead of the shaft 162 being connected to the clutch and brake disc 172, as shown in Fig. 6. The brake applying spring in the follow up motor, however, cannot stop the rotating armature 210 instantly, the result being that the armature rotates for one or two seconds after the lug 183 opens the switch 185 or 187, whereby the lug coasts to, or substantially to the midway position shown, after each switch opening operation. A rheostat 212 is connected in series in the follow-up motor circuit for adjusting the follow up motor to the most effective speed. A single current source 214 is provided for both the servo motor and the follow-up motor.

The operation of the mechanism shown in Fig. 5 is substantially as follows:

As long as the propeller is "on speed," (what is "on speed" will depend, of course, on the position of the governor control lever 142) the governor 130 will hold the contact 128 away from both the pitch-increase contacts 124 and the pitch-decrease contact 126, whereby no pitch change will take place.

If, now, the propeller load is lightened, as when the propeller enters a pocket of air of lesser density, or a change is made from level flight to a dive attitude, the propeller speeds up; the governor engages the contacts 128 and 124; the coil 164 of the servomotor is connected in series with the armature 160; the servomotor 166 rotates in the direction of the arrow 165; the gearing in the differential 188 changes the direction of rotation so that the shaft 186 rotates in a direction opposite the arrow 165; the thread on the shaft 186 draws the part 184 in the direction of the arrow 189 for pitch increase; the diameter of the belt track of the pulley 76 increases and that of the pulley 60 decreases whereby the propeller blades start turning to an increased pitch.

Now, in mechanisms of this class, in which the follow-up motor 204 is omitted, the blades continue to turn toward the pitch-increase condition until the pitch is considerably overcorrected before the governor 130 causes engagement of contact 128 with 126 to reverse the servomotor 166, whereupon pitch decrease continues until overcorrection takes place on the decrease side. This dangerous "hunting" is not present where a follow-up motor is used for the following reason:

When an overspeed propeller causes the governor 130 to engage the contacts 128 with 124 to cause rotation of the servomotor 156, to move the part 184 in the direction of the arrow 189 for starting pitch increase, the lug 183, in a very short interval of time, closes the switch 187, which rotates the follow-up motor in the direction of the arrow 211, which rotates the threaded shaft 186 opposite to the direction in which it is rotated by the servomotor 156.

The foregoing describes the operation for pitch increase. Obviously, pitch decrease is effected in a similar manner when the governor 130 engages the contact 128 with 126. In determining the time in which the follow-up motor will return the pitch-adjusting mechanism to the equilibrium position after it has been disturbed by the servomotor, the relative speeds of the two motors should be taken into account. So also should the distance which the lug 183 must travel left or right to close the switches 185 or 187 be carefully determined and adjusted since this determines the period of time which the servomotor operates before the follow-up motor starts, and, therefore, the degree of disturbance of the one-to-one relation of the pitch change pulleys before the follow-up motor brings them back to equilibrium. So also should the strength of the follow up motor brake spring 178 be carefully determined so that the armature 210 will continue to rotate for perhaps one second after the current is cut off, thereby to coast to or substantially to the normal ratio postiion of the variable ratio drive.

In the modification shown schematically in Fig. 8, a hydraulic fluid under pressure is employed for operating the pitch changing mechanism.

A frame 216 has fixed thereon a fluid pump 218, a fluid receptacle 220 connected to the intake side of the pump, a servo cylinder 222 to which the discharge side of the pump is connected, a follow-up cylinder 224, and a flyball governor 226. The servo cylinder 222, the follow-up cylinder 224 and the flyball governor 226 are mounted on the frame in axial alignment with each other.

An elongated servo piston 228 is axially slidable in the servo cylinder 222 and its piston rod 230 is connected to a follow-up piston 232 which is axially slidable in the follow-up cylinder 224. A piston rod 234 extends forwardly from the piston 232 and a link 236 is provided for connecting the rod 234 to the arm 122 of the pitch changing mechanism (see Fig. 5).

The elongated servo piston 228 is hollow and is bored to slidably receive a governor operated piston valve which consists of two small pistons 238 and 240 on a rod 242. The rod 242 is enlarged at its outer end and so associated with the flyweights 244 of the governor 226 that an increase in speed of the governor will move the rod 242 in the direction of the arrow 246. The flyweights 244 are hinged to the gear 243 which is driven by the pinion 245, the speed of which is a function of propeller speed. A spring 248 which is adjustable by the rack and pinion device 250 urges the rod 242 in a direction opposite the arrow 246.

Elongated ports 252 and 254 in the inner wall of the servo cylinder 222 are connected by pipes 256 and 258 to opposite ends of the follow-up cylinder 224. An elongated port 260 is connected to the outlet side of the pump 218, and two similar ports 262 and 264 are connected respectively by pipes 266 and 268 to the top of the receptacle 220. A relief valve 270 is included in the circuit to maintain a predetermined pressure at the outlet side of the pump.

Passageways 272, 274, and 276 extend through the wall of the hollow piston 228, the axial spacing of the passageways being equal to that of the ports 262, 260, and 264, respectively. Two additional passageways 278 and 280 extend through the wall of the hollow piston 228, the axial spacing of these two passageways being equal to that of the ports 252 and 254, respectively.

The two pistons 238 and 240 are of such axial thickness and are so spaced on the rod 242 that when the governor is in the "on speed" condition shown in Fig. 8, and the piston 232 is midway in the cylinder 224, as shown, the pistons 238 and 240 will respectively just cover the passageways 278 and 280, and the link 236 will hold the split pulley mechanism (shown in Fig. 5) in the equilibrium state. The drawing shows the movable parts of the mechanism as they appear when in the "on speed" condition.

The operation of the hydraulic control means shown in Fig. 8 is substantially as follows:

As long as the propeller remains "on speed," the governor weights 244 will remain in the midway position shown. When the propeller overspeeds, the weights move out, the pistons 238 and 240 of the piston valve move in the direction of the arrow 246 and thus complete a fluid passageway from pump 218 through 260, 274, 280, 258, to the left end of the follow-up cylinder 224, whereupon the fluid forces the follow-up piston 232 in the pitch increasing direction of the arrow 246 until it brings the passageways 278 and 280 under the pistons 238 and 240 to again shut off fluid flow.

In the meantime, however, the increased pitch has slowed up the propeller speed, which allows the spring 248 to move the pistons 238 and 240 of the piston valve far enough to the left to open a passageway from pump 218 through 260, 274, 278, 256, to the right end of the follow-up cylinder 224, whereupon the fluid forces the follow-up piston 232 back to the midway position in cylinder 224, whereby equilibrium is restored and no further pitch change is effected.

It is noted that, with a simple governing mechanism, as shown in Figs. 1 to 4, when the governor weights move from the midway position to disturb equilibrium between the two belt pulleys, this equilibrium cannot be completely restored to stop pitch change unless and until the weights come back to the midway position. The fly ball force decreases as the equilibrium position is approached. Although large corrections for off-speed are made practically instantaneously, the final approach takes several seconds because the rate of pitch change approaches zero as the equilibrium speed is reached.

In order to provide a constant force for varying the belt track diameters, it is desirable in large propellers and also in small ones where speed in returning to the equilibrium position and extreme sensitivity are desired, that servo mechanism means be provided for varying the belt track diameters in response to a signal from the governing mechanism.

In the governing systems shown in Fig. 5, therefore, the governor senses the off-speed condition, the servo mechanism responds to the governor by disturbing the equilibrium of the pulley mechanism to correct the off-speed condition by changing the pitch, and the follow-up mechanism restores the equilibrium of the pulley mechanism and completely stabilizes the pitch without waiting for the governor to assume the opposite sense and reverse the follow-up motor to restore pulley equilibrium.

In Fig. 8 hydraulic servo means are shown to provide a constant force for varying the belt track diameter in response to a signal furnished by the governor while maintaining the same relative displacement. In this instance the pulley mechanism reaches equilibrium at the same time as the governor fly balls.

Having thus described my invention, I claim:

1. For a propeller having a hub with laterally extending blades rotatable about their radial axes on bearings carried by said hub, pitch change mechanism comprising, in combination, a housing, means to hold said housing against rotation, two diametrically opposite countershafts rotatably supported in said housing with their rotational axes parallel to each other and to the hub rotational axis, a gear fast on the propeller hub, a gear fast on one countershaft in mesh with the propeller hub gear, a gear fast on the other countershaft, a speed-reducing gear train connecting the second said countershaft gear to the propeller blades for rotating said blades on their radial axes, two V belt-pulleys, one on each countershaft, split on a plane normal to their rotational axes, one part of each pulley being fixed on its countershaft and the other part splinedly mounted thereon for axial movement with respect to the fixed part, centrifugal weights hingedly carried on said hub operative to swing outward upon a rise in speed to shift the movable part of the pulley on the hub-driven countershaft away from its fixed part, and the movable part of the pulley on the blade driving countershaft toward its fixed part, a spring opposing said axial movement of said axially movable pulley parts, a V belt drivably encircling said pulleys, and a pair of idler pulleys positioned to hold said belt out of contact with said propeller hub.

2. For a propeller having a hub with laterally extending blades rotatable about their radial axes on bearings carried by said hub, pitch change mechanism comprising, in combination, a housing, means to hold said housing against rotation, two countershafts rotatably supported in said housing with their rotational axes parallel to each other and to the hub rotational axis, a gear fast on the propeller hub, a gear fast on one countershaft in mesh with the propeller hub gear, a gear fast on the other countershaft, a speed-reducing gear train connecting the second said countershaft gear to the propeller blades for rotating said blades on their radial axes, two V belt-pulleys, one on each countershaft, split on a plane normal to their respective rotational axes, one part of each pulley being fixed on its countershaft and the other part splinedly mounted thereon for axial movement with respect to the fixed part, centrifugal weights hingedly carried on said hub operative to swing outward upon a rise in speed to shift the movable part of the pulley on the hub driven countershaft away from its fixed part, and the movable part of the pulley on the blade driving counter shaft toward its fixed part, a spring opposing said axial movement of said axially movable pulley parts, and a V belt drivable encircling the pulleys.

3. For a propeller having a hub with laterally extending blades rotatable about their radial axes on bearings carried by said hub, pitch change mechanism comprising, in combination a housing, means to hold said housing against rotation, two countershafts rotatably supported in said housing with their rotational axes parallel to each other and to the hub rotational axis, a gear fast on the propeller hub, a gear fast on one countershaft in mesh with the propeller hub gear, a gear fast on the other countershaft, a speed-reducing gear train connecting the second said countershaft gear to the propeller blades for rotating said blades on their radial axes, two V belt-pulleys, one on each countershaft split on a plane normal to the countershaft rotational axes, one part of each pulley being fixed on its countershaft and the other part splinedly mounted thereon for axial movement with respect to the fixed part, centrifugal weights hingedly carried on said hub operative to swing outward upon a rise in speed to shift the movable part of one pulley away from its fixed part, and the movable part of the other pulley toward its fixed part, a spring opposing said axial movement of said axially movable pulley parts, and a V belt drivably encircling said pulleys.

4. For a propeller having a hub with laterally extending blades rotatable about their radial axes on bearings carried by said hub, pitch change mechanism comprising, in combination, a frame, means to hold said frame against rotation, two countershafts rotatably supported in said frame, a gear fast on the propeller hub, a gear fast on one countershaft in mesh with the propeller hub gear, a gear fast on the other countershaft, gearing connecting the second said countershaft gear to the propeller blades for rotating said blades on their radial axes, two V belt-pulleys, one on each countershaft each split on a plane normal to the countershaft rotational axis, one part of each pulley being fixed on its countershaft and the other part splinedly mounted thereon for axial movement with respect to the fixed part, centrifugal weights hingedly carried on said hub operative to swing outward upon a rise in speed to shift the movable part on one pulley away from its fixed part, and the movable part of the other pulley toward its fixed part, a spring opposing said axial movement of said axially movable pulley parts, and a V belt drivably encircling said pulleys.

5. For a propeller having a propeller shaft and a hub with laterally extending blades rotatable about their radial axes on bearings carried by said hub, the improved pitch change mechanism which comprises, in combination, a frame, means to hold said frame against rotation, two countershafts with rotational axes spaced apart from the hub rotational axis rotatably supported on bearings in said frame, rotation transmitting means connecting the propeller shaft to one said countershaft, rotation transmitting means connecting the other said countershaft to the propeller blades for rotating said blades on their radial axes, two V belt-pulleys, one on each countershaft each pulley split on a plane normal to the countershaft rotational axis, one part of each pulley being fixed on its countershaft and the other part splinedly mounted thereon for axial movement with respect to the fixed part, centrifugal weights hingedly carried on said hub operative to swing outward upon a rise in speed to shift the movable part of one pulley away from its fixed part, and the movable part of the other pulley toward its fixed part, a spring opposing said axial movement of said axially movable pulley parts, and a V belt drivably encircling said pulleys.

6. For a propeller having a propeller shaft and a hub with laterally extending blades rotatable about their radial axes on bearings carried by said hub, the improved pitch change mechanism which comprises, in combination, a frame, means to hold said frame against rotation, two countershafts each having their rotational axis axially spaced apart from the hub rotational axis rotatably supported on bearings in said frame, rotation transmitting means drivably connecting the propeller shaft to one countershaft, rotation transmitting means drivably connecting the other countershaft to the propeller blades for rotating said blades on their radial axes, two belt-pulleys, one fixed on each countershaft, mechanism associated with said belt-pulleys for altering the diameter of their belt tracks, centrifugal weights hingedly carried on said hub operative to swing outward upon a rise in speed to operate the mechanism to increase the diameter of the belt track on one belt-pulley and decrease the diameter of the belt track on the other belt-pulley, a spring opposing outward movement of said centrifugal weights, and a belt drivably encircling said pulleys.

7. For a propeller having a shaft and a hub with laterally extending blades rotatable about their radial axes on bearings carried by said hub, the improved pitch change mechanism which comprises, in combination, a frame, means to hold said frame against rotation, two countershafts having rotational axes spaced apart from the hub rotational axis and from each other rotatably supported on bearings in said frame, rotation transmitting means drivably connecting the propeller shaft to one countershaft, rotation transmitting means drivably connecting the other countershaft to the propeller blades for rotating said blades on their radial axes, two belt-pulleys, one on each countershaft, mechanism associated with said belt-pulleys for altering the diameters of their belt tracks, means responsive to a change in speed of the propeller operative upon a rise in speed to increase the diameter of the belt track of one belt-pulley and decrease the diameter of the belt track of the other belt-pulley, and a belt drivably encircling said belt-pulleys.

8. For a propeller having a shaft and a hub with laterally extending blades rotatable about their radial axes on bearings carried by said hub, the improved pitch change mechanism which comprises, in combination, a frame, means to hold said frame against rotation, two countershafts rotatably supported on bearings in said frame, the rotational axes of said countershafts and said hub being spaced apart and parallel, rotation transmitting means drivably connecting the propeller shaft to one countershaft, rotation transmitting means drivably connecting the other countershaft to the propeller blades for rotating said blades on their radial axes, two belt-pulleys, one on each countershaft, a belt drivably encircling the two said belt-pulleys, and speed responsive means associated with said belt-pulleys and said propeller hub operative upon a change in propeller speed to make the belt track of one of the belt-pulleys larger and that of the other belt-pulley smaller.

9. For a propeller having a shaft and a hub with laterally extending bearing means, and blades rotatable about their radial axes on said bearing means, an improved pitch change mechanism which comprises, in combination, two countershafts with rotational axes parallelly spaced apart from each other and from the hub rotational axis, means drivably connecting one countershaft to the propeller shaft, means drivably connecting the other countershaft to the propeller blades for rotating said blades about their radial axes, a pulley on each countershaft, a belt drivably encircling said pulleys, and means to vary the belt track diameter of at least one of said pulleys.

10. For a propeller having a hub with a laterally extending bearing means and blades rotatable about their radial axes on said bearing means, pitch change mechanism comprising, in combination, two countershafts, the countershafts and the hub having parallel spaced apart rotational axes, means drivably connecting said hub to one of the countershafts, means drivably connecting the other countershaft to the propeller blades for rotating said blades about their radial axes, a variable speed drive connecting said countershafts one to the other, said variable speed drive having a normal ratio whereby no pitch change is effected but adapted to be shifted for a higher or lower ratio for effecting pitch change, a governor, normally in a neutral position but sensitive to an "off speed" condition of the propeller to move away from the neutral position, a servo mechanism having servo means responsive to the movement of said governor from its neutral position to change the ratio of the variable speed drive from a normal to an abnormal ratio for effecting pitch correction, and a follow-up mechanism responsive to the movement of said servo means to the abnormal ratio position of the variable speed drive for substantially restoring said abnormal ratio to normal.

11. For a propeller having a hub with a laterally extending bearing means and blades rotatable about their radial axes on said bearing means, pitch change mechanism comprising, in combination, two countershafts with parallel rotational axes spaced apart from each other and from the hub rotational axis, means drivably connecting said hub to one of the countershafts, means drivably connecting the other countershaft to the propeller blades for rotating said blades about their radial axes, a variable speed drive connecting said countershafts one to the other, said variable speed drive having a normal ratio whereby no pitch change is effected but adapted to be shifted for a higher or lower ratio for effecting pitch change, a governor, normally in a neutral position but sensitive to an "off speed" condition of the propeller to move away from the neutral position, a servo mechanism normally inactive but having servo means responsive to the movement of said governor from its neutral position to move to a changed position to thereby change the ratio of the variable speed drive from the normal to an abnormal ratio for effecting pitch correction, and a follow-up mechanism responsive to the movement of said servo means to the abnormal ratio position of the servo mechanism for restoring said abnormal ratio substantially to normal.

12. For a propeller having a hub with a laterally extending bearing means and blades rotatable about their radial axes on said bearing means, pitch change mechanism comprising, in combination, two countershafts spaced apart from the hub and from each other, the rotational axes of the hub and countershafts being parallel one with the other, means drivably connecting said hub to one of the countershafts, means drivably connecting the other countershaft to the propeller blades for rotating said blades about their radial axes, a variable speed drive connecting said countershafts one to the other, said variable speed drive having a normal ratio whereby no pitch change is effected but adapted to be shifted for a higher or lower ratio for effecting pitch change, a governor, normally in a neutral position but sensitive to an "off speed" condition of the propeller to move away from the neutral position, a servo mechanism having servo means normally in a neutral position but adapted upon movement of said governor from its neutral position to be moved to a new position thereby to change the ratio of the variable speed drive from the normal to an abnormal position for effecting pitch correction, and a follow-up mechanism responsive to the movement of the servo means to the new position for returning said shifting means and thereby said ratio substantially to normal.

13. For a propeller having a hub with a laterally extending bearing means and blades rotatable about their radial axes on said bearing means, pitch change mechanism comprising, in combination, two countershafts having their rotational axis spaced apart and parallel to the hub rotational axis and parallel to each other, means drivably connecting said hub to one of the countershafts, means drivably connecting the other countershaft to the propeller blades for rotating said blades about their radial axes, a variable speed drive connecting said countershafts one to the other, said variable speed drive having a normal ratio whereby no pitch change is effected but adapted to be shifted for a higher or lower ratio for effecting pitch change, a governor operated electric switch, normally open but sensitive to an "off speed" condition of the propeller to be closed, an electric servo mechanism having servo means responsive to the closing of said switch to change the ratio of the variable speed drive from a normal to an abnormal ratio for effecting pitch correction, and an electric follow-up mechanism responsive to the movement of said servo means to the abnormal ratio position of the variable speed drive for restoring said abnormal ratio substantially to normal.

14. For a propeller having a hub with a laterally extending bearing means and blades rotatable about their radial axes on said bearing means, pitch change mechanism comprising, in combination, two countershafts having their rotational axes spaced apart and parallel and spaced from and parallel to the hub axis, means drivably connecting said hub to one of the countershafts, means drivably connecting the other countershaft to the propeller blades for rotating said blades about their radial axes, a variable speed drive connecting said countershafts one to the other, said variable speed drive having a normal ratio whereby no pitch change is effected but adapted to be shifted for a higher or lower ratio for effecting pitch change, a flyball governor, normally in a neutral position but sensitive to an "off speed" condition of the propeller to move away from the neutral position, a servo mechanism which includes a hydraulic motor and a valve mechanism having one valve member which is responsive to the movement of said governor from its neutral position to operate said motor and change the ratio of the variable speed drive for effecting pitch correction, and a second valve member responsive to a changed ratio of the variable speed drive to cooperate with the first said valve member to close the valve and thereby limit the rate of pitch change to a certain amount.

15. In a variable pitch propeller having a pitch changing mechanism normally in a neutral position but shiftable in one or the other direction for increasing or decreasing the pitch, means for operating the pitch changing mechanism which comprises a differential gear having two driving elements and a driven element, a reversible servomotor on one driving element, a reversible follow-up motor on the other driving element, shifting means on the driven element operative by rotation of the servomotor to shift the pitch changing mechanism, a centrifugal governor, an electric reversing switch operative upon a rise and fall in the speed of said governor to rotate said servomotor backward or forward, a second reversing switch associated with said shifting means operative upon movement of said shifting means in one or the other direction to rotate said follow-up motor backward or forward, said electric switches being so connected to their respective motors that when the first switch causes the servomotor to move the shifting means in one direction until the second reversing switch operates, the second reversing switch causes the follow-up motor to rotate in a direction which returns the shifting means to substantially the neutral position.

16. In a variable pitch propeller mechanism including blades individually pivotally mounted on radial axes in a propeller hub, pitch change mechanism including a gear freely rotatably mounted on the propeller hub for changing the pitch of the propeller blades, and means for increasing or decreasing the speed of rotation of said gear relative to said hub to cause an increase or decrease in pitch of the propeller blades respectively, said means including a pair of countershafts with rotational axes parallelly spaced apart from the rotational axis of the propeller hub and from each other, one driven about its own axis by the propeller hub and the other drivingly connected to said gear, a variable ratio pulley drive interconnecting said countershafts, said variable ratio pulley drive being constructed and arranged so that as the diameter of one pulley is increased the diameter of the other pulley is simultaneously decreased, control means for controlling the respective pulley diameters, servo-mechanism operatively connected to said control means to actuate the same, and speed responsive means operated in response to the speed of rotation of the propeller for controlling said servo mechanism.

17. In a variable pitch propeller mechanism including blades individually pivotally mounted on radial axes in a propeller hub, pitch change mechanism including a gear freely rotatably mounted on the propeller hub for changing the pitch of the propeller blades, and means for increasing or decreasing the speed of rotation of said gear relative to said hub to cause an increase or decrease in pitch of the propeller blades respectively, said means including a pair of countershafts having rotational axes parallelly spaced from and in the same plane as the hub axis but on opposite sides thereof, one driven about its own axis by the propeller hub and the other drivingly connected to said gear, a variable ratio pulley drive interconnecting said axially spaced countershafts, said variable ratio pulley drive being constructed and arranged so that as the diameter of one pulley is increased the diameter of the other pulley is simultaneously decreased, and speed responsive means operated in response to the speed of rotation of the propeller for controlling the respective pulley diameters.

18. In a variable pitch propeller mechanism including blades individually pivotally mounted in a propeller hub for rotation about their radial axes, pitch change mechanism including a gear freely rotatably mounted on the propeller hub for changing the pitch of the propeller blades, and means for increasing or decreasing the speed of rotation of said gear relative to said hub to cause an increase or decrease in pitch of the propeller blades respectively, and means including a pair of countershafts having their rotational axes parallelly spaced from the hub rotational axis and from each other, one driven about its own axis by the propeller hub and the other drivingly connected to said gear, a variable ratio pulley drive interconnecting said countershafts, said variable ratio pulley drive being constructed and arranged so that as the diameter of one pulley is increased the diameter of the other pulley is simultaneously decreased, and speed responsive means consisting of flyballs operatively connected to control the respective pulley diameters to maintain an arbitrary constant speed.

HOWARD M. McCOY.

REFERENCES CITED

The following references are of record in the file of this patent:

UNITED STATES PATENTS

| Number | Name | Date |
| --- | --- | --- |
| 1,726,726 | Wettstein et al. | Sept. 3, 1929 |
| 1,483,536 | Warren | Feb. 12, 1934 |
| 2,117,891 | Kalin | May 17, 1938 |
| 2,127,687 | Heath | Aug. 23, 1938 |
| 2,133,593 | Tautz | Oct. 18, 1938 |
| 2,164,489 | Berliner | July 4, 1939 |
| 2,225,408 | Berliner | Dec. 17, 1940 |
| 2,233,822 | Schubbe | Mar. 4, 1941 |
| 2,271,435 | Lampton | Jan. 27, 1942 |
| 2,356,772 | Magee | Aug. 29, 1944 |

FOREIGN PATENTS

| Number | Country | Date |
| --- | --- | --- |
| 217,669 | Switzerland | Apr. 16, 1942 |
| 703,319 | Germany | Feb. 6, 1941 |
| 776,377 | France | Jan. 24, 1935 |